(12) United States Patent
Boothby et al.

(10) Patent No.: US 9,109,635 B2
(45) Date of Patent: Aug. 18, 2015

(54) AXLE ASSEMBLY HAVING A MOVEABLE CLUTCH COLLAR

(71) Applicant: ArvinMeritor Technology, LLC, Troy, MI (US)

(72) Inventors: Timothy J. Boothby, Troy, MI (US); Jerome M. Kunert, Warren, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 121 days.

(21) Appl. No.: 13/761,787

(22) Filed: Feb. 7, 2013

(65) Prior Publication Data
US 2014/0216883 A1 Aug. 7, 2014

(51) Int. Cl.
| F16H 48/20 | (2012.01) |
| F16D 11/14 | (2006.01) |
| F16D 25/061 | (2006.01) |
| F16H 48/24 | (2006.01) |
| F16H 48/32 | (2012.01) |
| F16D 11/00 | (2006.01) |

(52) U.S. Cl.
CPC .............. *F16D 11/14* (2013.01); *F16D 25/061* (2013.01); *F16H 48/24* (2013.01); *F16H 48/32* (2013.01); *F16D 2011/004* (2013.01)

(58) Field of Classification Search
CPC .......... F16H 48/08; F16H 48/20; F16H 48/32
USPC ........................ 192/69.41, 69.9, 85.18, 85.57
See application file for complete search history.

(56) References Cited

U.S. PATENT DOCUMENTS

| 5,806,623 A | 9/1998 | Clohessy |
| 6,543,858 B1 | 4/2003 | Melton |
| 2006/0037830 A1* | 2/2006 | Sowul et al. ................. 192/69.9 |
| 2006/0046890 A1* | 3/2006 | Aikawa .......................... 475/231 |

* cited by examiner

*Primary Examiner* — Huan Le
(74) *Attorney, Agent, or Firm* — Brooks Kushman P.C.

(57) ABSTRACT

An axle assembly having a clutch collar. The clutch collar is moveable between a first position in which the clutch collar couples the spider housing to the hub and a second position in which the clutch collar decouples the spider housing from the hub.

20 Claims, 4 Drawing Sheets

AXLE ASSEMBLY HAVING A MOVEABLE CLUTCH COLLAR

TECHNICAL FIELD

This patent application relates to an axle assembly having a moveable clutch collar.

BACKGROUND

A locking hub clutch system is disclosed in U.S. Pat. No. 5,806,623.

SUMMARY

In at least one embodiment, an axle assembly is provided. The axle assembly may include a spindle, an axle shaft, a hub, a spider assembly, and a clutch collar. The axle shaft may extend through the spindle and may be configured to rotate about an axis. The hub may be rotatably disposed on the spindle. The spider assembly may be configured to be rotated by the axle shaft. The spider assembly may have a set of hub reduction gears that may be operatively connected to a spider housing. The clutch collar may be disposed between the hub and the spider housing. The clutch collar may be movable along the axis between a first position and a second position. The clutch collar may couple the spider housing to the hub such that the spider housing rotates with the hub when the clutch collar is in the first position. The clutch collar may decouple the spider housing from the hub such that the hub rotates independently of the spider housing when the clutch collar is in the second position.

In at least one embodiment, an axle assembly is provided. The axle assembly may include an axle shaft, a spindle, a hub, a spider assembly, a cover, and a clutch collar. The axle shaft may be configured to rotate about an axis. The spindle may receive the axle shaft. The hub may be rotatably disposed on the spindle. The spider assembly may be rotatably coupled to the axle shaft. The spider assembly may have a spider housing that may be spaced apart from the hub. The cover may be fixedly disposed with respect to the hub. The cover may have a clutch collar cavity. The clutch collar may be movably disposed in the clutch collar cavity. The clutch collar may move between a first position in which the clutch collar couples the spider housing to the hub such that the spider housing rotates with the hub and a second position in which the clutch collar decouples the spider housing from the hub such that the hub rotates independently of the spider housing.

In at least one embodiment, an axle assembly is provided. The axle assembly may include an axle housing, an axle shaft, a spindle, a hub, a spider assembly, and a clutch collar. The axle housing may have an input for receiving torque. The axle shaft may be at least partially disposed in the axle housing. The axle shaft may be coupled to the input. The spindle may be connected to the axle housing. The axle shaft may extend through the spindle. The hub may be rotatably disposed on the spindle. The spider assembly may be configured to be rotated by the axle shaft. The spider assembly may have a spider housing. The clutch collar may be disposed between the hub and the spider housing. The clutch collar may be movable between a first position and a second position. The clutch collar may couple the spider housing to the hub such that the spider housing rotates with the hub when the clutch collar is in the first position. The clutch collar may decouple the spider housing from the hub such that the hub rotates independently of the spider housing and the axle shaft when the clutch collar is in the second position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
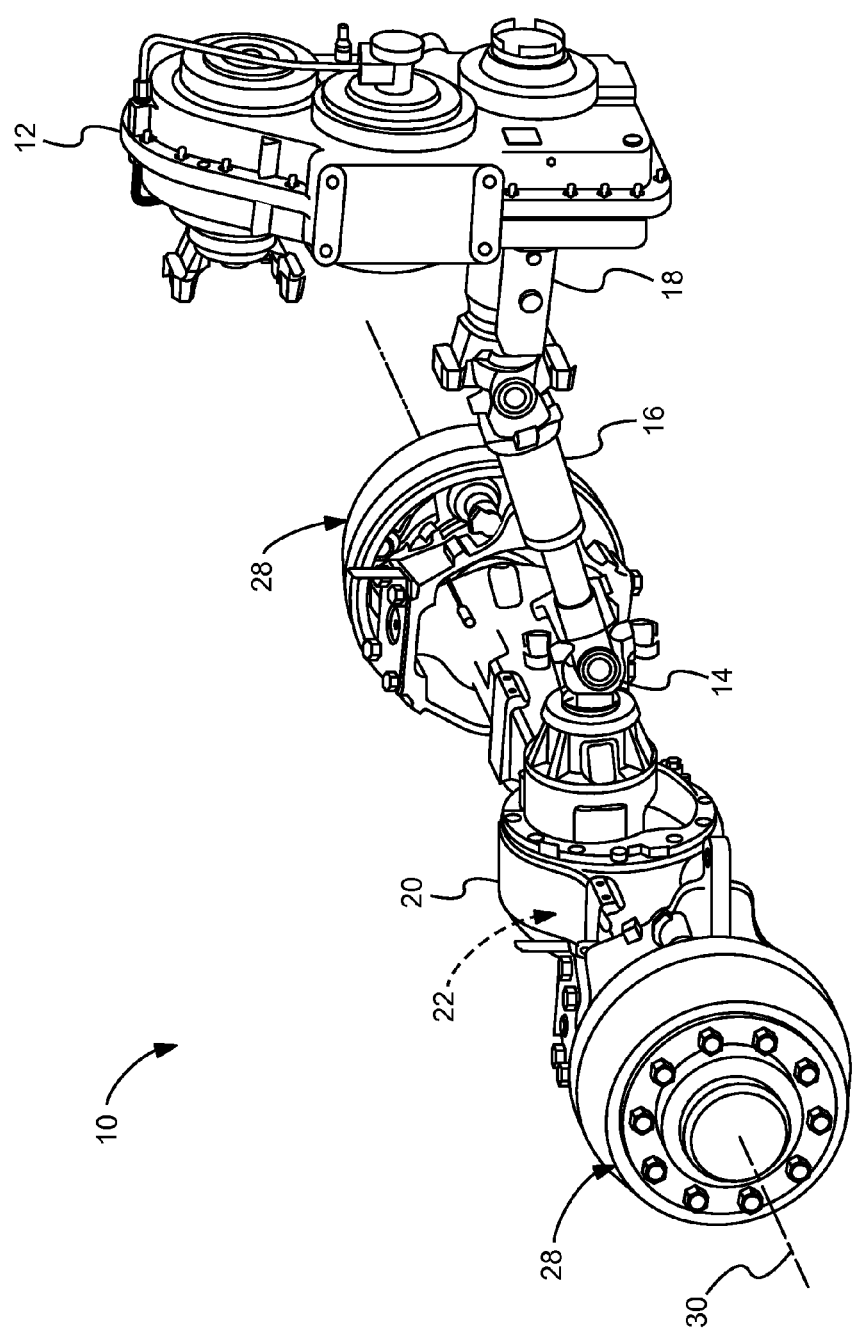
FIG. 1 is a perspective view of a portion of a vehicle drivetrain having an axle assembly.

Referring to FIG. 1, an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may provide torque to one or more traction wheel assemblies that may include a tire mounted on a wheel. The axle assembly 10 may be steerable in one or more embodiments. The axle assembly 10 may receive torque from a vehicle drivetrain component, such as an internal combustion engine and/or transmission. For example, the axle assembly 10 may receive torque from a transmission via a transfer case 12. The transfer case 12 may be coupled to the transmission via a drive shaft and may be coupled to an input 14 of the axle assembly 10 with a prop shaft 16. The transfer case 12 may include a transfer case clutch 18 that may permit or inhibit the transmission of torque from the transfer case 12 to the axle assembly 10. As such, torque may not be transmitted to the axle assembly 10 via the prop shaft 16 when the transfer case clutch 18 disconnects or disables torque transmission from the transfer case 12 to the axle assembly 10.

Figure 2:
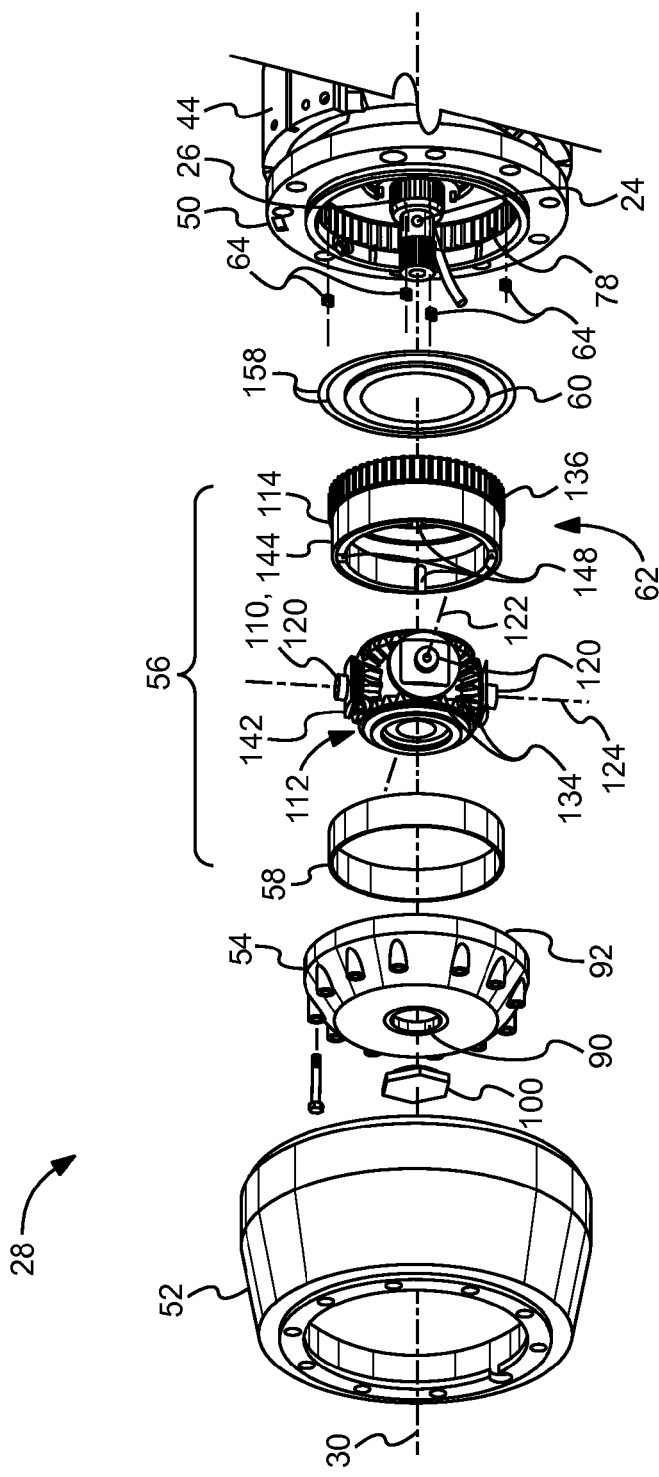
FIG. 2 is an exploded perspective view of a wheel end of the axle assembly.
Figure 3:
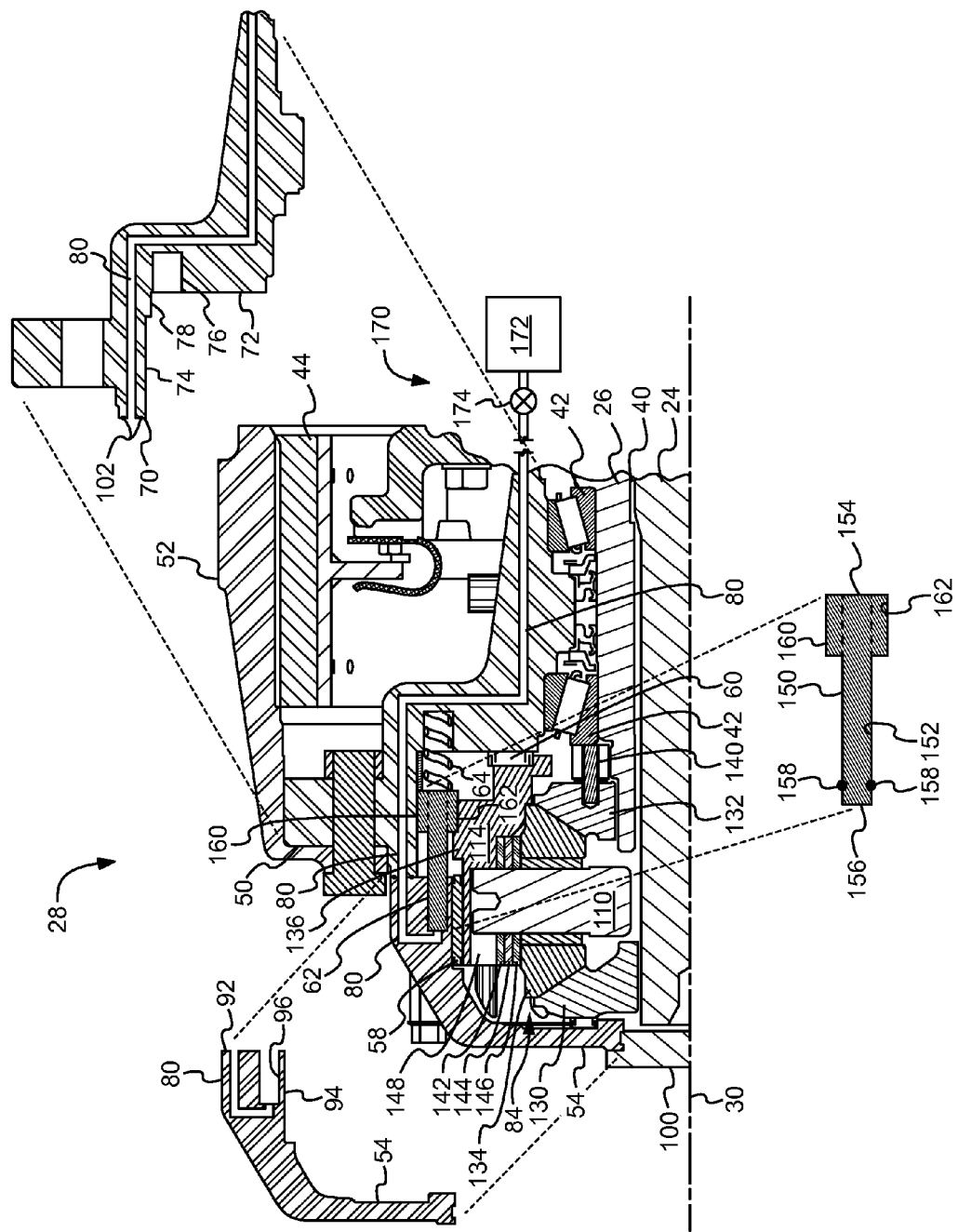
FIGS. 3 and 4 are sections view of a portion of the axle assembly showing a clutch collar in first and second positions, respectively.

Referring to FIGS. 1-3, the axle assembly 10 may include an axle housing 20, a differential 22, at least one axle shaft 24, a spindle 26, and a wheel end assembly 28.

The axle housing 20 may receive various components of the axle assembly 10. In addition, the axle housing 20 may facilitate mounting of the axle assembly 10 to the vehicle. The axle housing 20 may define a cavity that may receive at least a portion of the differential 22.

The differential 22 may be configured to transmit torque to the vehicle traction wheel assemblies and permit the traction wheel assemblies to rotate at different velocities. An abbreviated discussion of the operation of the differential 22 is provided since the differential 22 is concealed by the axle housing 20 in FIG. 1. The differential 22 may include a pinion and a ring gear. The pinion may be coupled to at least one torque source, such as a vehicle drivetrain component like the transfer case 12, via the input 14 as previously described. The pinion may be rotatably supported by one or more bearings and may rotate about an axis. Torque that is provided to the pinion may be transmitted to the ring gear. Torque may be transmitted from the ring gear to each axle shaft 24 and from each axle shaft 24 to a corresponding wheel end assembly 28 and traction wheel assembly.

At least a portion of each axle shaft 24 may be rotated about an axis 30 by the differential 22. Each axle shaft 24 may have a first end and a second end. The first end may be coupled to the differential 22. The second end may be disposed opposite the first end and may be located outside of the axle housing 20. More specifically, the second end may extend through a hole that may be provided at an end of an arm portion of the axle housing 20. The axle shafts 24 may or may not be configured for use with an independent suspension system. For instance, an axle shaft 24 that is configured for use with an independent suspension system may have multiple shaft segments and/or joints, such as constant-velocity joints that facilitate relative movement between the differential 22 and a wheel end assembly 28. Alternatively, an axle shaft 24 may be configured as a solid or "live" axle that may not be provided with an independent suspension system. An axle bearing may be provided between the first and second ends of the axle shaft 24 to rotatably support the axle shaft 24.

The spindle 26 may be connected to the axle housing 20. The spindle 26 may generally extend along but may not rotate about the axis 30. The spindle 26 may define a hole 40 through which the axle shaft 24 extends. As such, the spindle 26 may be spaced apart from the axle shaft 24 to permit the axle shaft 24 to rotate about the axis 30. As is best shown in FIG. 3, the spindle 26 may support one or more wheel bearings 42 that rotatably support the wheel end assembly 28 as will be discussed in more detail below. In addition, one or more brake pad assemblies 44 may be spaced apart from the spindle 26 to inhibit rotation of an associated wheel hub assembly 28. A brake pad assembly 44 may be part of a friction brake that may be configured as a drum brake or a disc brake.

Referring to FIGS. 2 and 3, the wheel end assembly 28 may couple the axle shaft 24 to a traction wheel assembly that may include a tire mounted on a wheel. In these Figures, the wheel end assembly 28 is configured with a drum brake configuration, but a disc brake configuration may be employed. The wheel end assembly 28 may include a hub 50, a brake drum 52, a cover 54, a spider assembly 56, a bearing 58, a thrust bearing 60, a clutch collar 62, and one or more biasing members 64. In a disc brake configuration, a rotor may replace the brake drum 52 as is known by those skilled in the art.

The hub 50 may be rotatably disposed on the spindle 26. For instance, one or more wheel bearings 42 may be mounted on spindle 26 and may rotatably support the hub 50. The hub 50 may have a first surface 70, a second surface 72, and a third surface 74. The first surface 70 may face away from the differential 22. In at least one embodiment, the first surface 70 may extend away from the axis 30 or may be disposed radially with respect to the axis 30. The second surface 72 may be spaced apart from the first surface 70. The second surface 72 may also extend away from and/or extend radially with respect to the axis 30. The second surface 72 may include one or more pockets 76 that may receive a biasing member 64 as will be discussed in more detail below. The third surface 74 may extend from the first surface 70 to the second surface 72. The third surface 74 may include a hub spline 78 that may include a plurality of teeth that may extend generally parallel to the axis 30.

The hub 50 may also include a passage 80. The passage 80 may facilitate the flow of pressurized fluid to actuate the clutch collar 62 as will be discussed in more detail below. The passage 80 may be at least partially defined by a conduit or tube that may be external to the hub 50 and that may extend through the hub 50 and/or cover 54 in one or more embodiments.

The brake drum 52 may be fixedly disposed on the hub 50. The brake drum 52 may extend around the brake pad assemblies 44 and may at least partially define an exterior surface of the wheel end assembly 28. In FIGS. 1 and 2, a drum brake configuration is shown; however, a disc brake configuration may be employed in one or more embodiments.

The cover 54 may be fixedly disposed on the hub 50. The cover 54 may cooperate with the hub 50 to define a cavity 84 that receives the spider assembly 56. In at least one embodiment, the cover 54 may be disposed at an end of the wheel end assembly 28 adjacent to the brake drum 52 to help conceal the spider assembly 56 and an end of the axle shaft 24 and to inhibit the entry of contaminants. In at least one embodiment, the cover 54 may include a cover hole 90, an end surface 92, an inner surface 94, and a clutch collar cavity 96.

The cover hole 90, which is best shown in FIG. 2, may be disposed along the axis 30 and may be disposed proximate the end of the axle shaft 24. Optionally, a plug 100 may be disposed in the cover hole 90. In at least one embodiment, the plug 100 may include threads that mate with corresponding threads of the cover hole 90.

The end surface 92 may face toward the hub 50. The inner surface 94 may extend from the end surface 92 in a direction that extends away from the differential 22. As such, the inner surface 94 may face toward and may be disposed radially about the axis 30.

The clutch collar cavity 96 may receive the clutch collar 62. The clutch collar cavity 96 may extend from the end surface 92 and may be provided between and spaced apart from the inner surface 94 and an outer surface disposed opposite the inner surface 94. The clutch collar cavity 96 may be configured as a ring that may extend around the axis 30.

The passage 80 may continue through the cover 54 such that the portion of the passage 80 in the cover 54 may be fluidly connected with the portion of the passage 80 in the hub 50. The passage 80 may extend from the end surface 92 to the clutch collar cavity 96. A seal 102, such as one or more O-rings, may be provided at the interface of the cover 54 and hub 50 adjacent to the passage 80 to inhibit the leakage of a pressurized fluid as will be discussed in more detail below.

The spider assembly 56 may be generally disposed in the cavity 84. The spider assembly 56 may transmit torque from the axle shaft 24 to the hub 50 when the clutch collar 62 is in a first position as will be described in more detail below. In addition, the spider assembly 56 may provide gear reduction between the axle shaft 24 and a traction wheel disposed on the hub 50. In at least one embodiment, the spider assembly 56 may include a spider 110, a set of hub reduction gears 112, and a spider housing 114.

The spider 110 may rotate about the axis 30. The spider 110 may have a center bore that may receive and may be spaced apart from the axle shaft 24. The spider 110 may include a set of pins 120. The pins 120 may extend away from the center bore and may be arranged along a first axis 122 and a second axis 124. The first axis 122 and the second axis 124 may intersect and may be disposed substantially perpendicular to each other and substantially perpendicular to the axis 30. Ends of the pins 120 may be received in the spider housing 114 and may be spaced apart from the cover 54 so as not to interfere with rotation of the cover 54 and hub 50. Alternatively, fewer pins 120 may be provided in one or more embodiments. For example, two pins 120 may be provided that each receive a corresponding hub reduction gear 112.

The set of hub reduction gears 112 may include an axle shaft gear 130, a spindle gear 132, and a set of pinion gears 134.

The axle shaft gear 130 may be fixedly disposed on the axle shaft 24. For example, the axle shaft gear 130 may include a hole that includes a spline that mates with a corresponding spline on the axle shaft 24. As such, the axle shaft gear 130 may rotate with the axle shaft 24.

The spindle gear 132 may be fixedly disposed on the spindle 26. For example, the spindle gear 132 may include a hole that has a spline that mates with a corresponding spline on the spindle 26. An anti-rotation pin 140 may be provided to inhibit rotation of an adjustment nut with respect to the spindle 26.

A pinion gear 134 may be rotatably disposed on each pin 120. Each pinion gear 134 may be generally disposed in the spider housing 114 and may be retained on a corresponding pin 120 with one or more fasteners, such as a first washer 142, a second washer 144, and a thrust bearing 146. In at least one embodiment, two pinion gears 134 may rotate about pins 120 that extend along the first axis 122 and two pinion gears 134 may rotate about pins 120 that extend along the second axis 124. Each pinion gear 134 may include a set of teeth that mate with the axle shaft gear 130 and spindle gear 132. In addition, a set of roller bearings may be disposed between the pinion gear 134 and each pin 120 to facilitate rotation of a pinion gear 134.

The spider housing 114 may be disposed in the cavity 84. The spider housing 114 may include a plurality of slots 148 that may receive a corresponding pin 120 of the spider 110. As such, the spider housing 114 may rotate about the axis 30 with the spider 110. The slots 148 may be open at an end or side of the spider housing 114 that faces toward the cover 54 to facilitate assembly. The spider housing 114 may also include a spider housing spline 136. The spider housing spline 136 may be disposed along an outside circumferential surface of the spider housing 114. The spider housing spline 136 may include a plurality of teeth that may extend substantially parallel to the axis 30. Alternatively, the spider housing spline 136 may be replaced by a face gear configuration that may selectively mate with a corresponding face gear on the clutch collar 62.

The bearing 58, if provided, may facilitate rotation of the spider housing 114 with respect to the cover 54. The bearing 58 may be disposed between an outside circumferential surface of the spider housing 114 and the inner surface 94 of the cover 54. The bearing 58 may have any suitable configuration. For example, the bearing 58 may be configured as a set of roller bearings that may be radially disposed around the axis 30.

The thrust bearing 60, if provided, may be disposed between the hub 50 and the spider housing 114. The thrust bearing 60 may be configured to inhibit movement of the spider housing 114 with respect to the hub 50. The thrust bearing 60 may have a ring-like configuration and may be radially disposed with respect to the axis 30. For example, the thrust bearing 60 may be disposed between the spindle 26 and the hub 50 and/or biasing member 64.

The clutch collar 62 may be disposed between the hub 50 and the spider housing 114. The clutch collar 62 may have a generally ring-like configuration and may extend around the axis 30. In addition, the clutch collar 62 may move axially or along the axis 30 between a first position and a second position to couple and decouple the spider assembly 56 and the hub 50. In the embodiment shown in FIGS. 2-4, the clutch collar 62 is shown with multiple splines that facilitate engagement. Alternatively, one or more splines may be replaced by or supplemented with a face gear configuration, such as by providing one or more gear teeth along surfaces of the clutch collar 62 and/or spider housing 114 that may face each other and may extend radially with respect to the axis 30.

The clutch collar 62 may have an outer surface 150, an inner surface 152, a first end 154, a second end 156, and one or more seals 158.

The outer surface 150 may face away from the axis 30. The outer surface 150 may include a first spline 160. The first spline 160 may be disposed near the first end 154. The first spline 160 may include a plurality of teeth that may extend generally parallel to the axis 30. The first spline 160 may mate with the hub spline 78 to inhibit rotation of the clutch collar 62 with respect to the hub 50 while permitting axial movement, or movement along the axis 30.

The inner surface 152 may be disposed opposite the outer surface 150. The inner surface 152 may include a second spline 162. The second spline 162 may disposed near the first end 154. For example, the second spline 162 may extend from the first end 154 toward the second end 156. The second spline 162 may include a plurality of teeth that may extend generally parallel to the axis 30. The second spline 162 may mate with the spider housing spline 136 when the clutch collar 62 is in the first position. The second spline 162 may disengage the spider housing spline 136 when the clutch collar 62 is in the second position.

The second end 156 may be disposed opposite the first end 154. The second end 156 may be received in the clutch collar cavity 96.

One or more seals 158, such as O-rings, may be disposed between the clutch collar 62 and cover 54 to inhibit leakage of pressurized fluid from the clutch collar cavity 96.

One or more biasing members 64 may extend from the hub 50 to the clutch collar 62. In FIG. 2, four biasing members 64 are shown, although a greater or lesser number may be employed. The biasing members 64 may bias the clutch collar 62 toward the first position. Each biasing member 64 may be received in a corresponding pocket 76 in the hub 50. The biasing members 64 may engage the hub 50 and the clutch collar 62. In at least one embodiment, a biasing member 64 may be configured as a spring.

An actuator 170 may be provided to move the clutch collar 62 from the first position toward the second position. In at least one embodiment, the actuator 170 may include a pressurized fluid source 172 that provides a pressurized fluid to actuate the clutch collar 62. The pressurized fluid may be a gas, such as air, or a liquid, such as a hydraulic fluid in one or more embodiments. The pressurized fluid may be provided to the clutch collar 62 via the passage 80. A control valve 174 may be provided to control the flow of pressurized fluid from the pressurized fluid source 172 to the clutch collar 62. The control valve 174 may also control venting of the pressurized fluid to permit the clutch collar 62 to move from the second position toward the first position under the biasing force of the biasing members 64.

Figure 4:
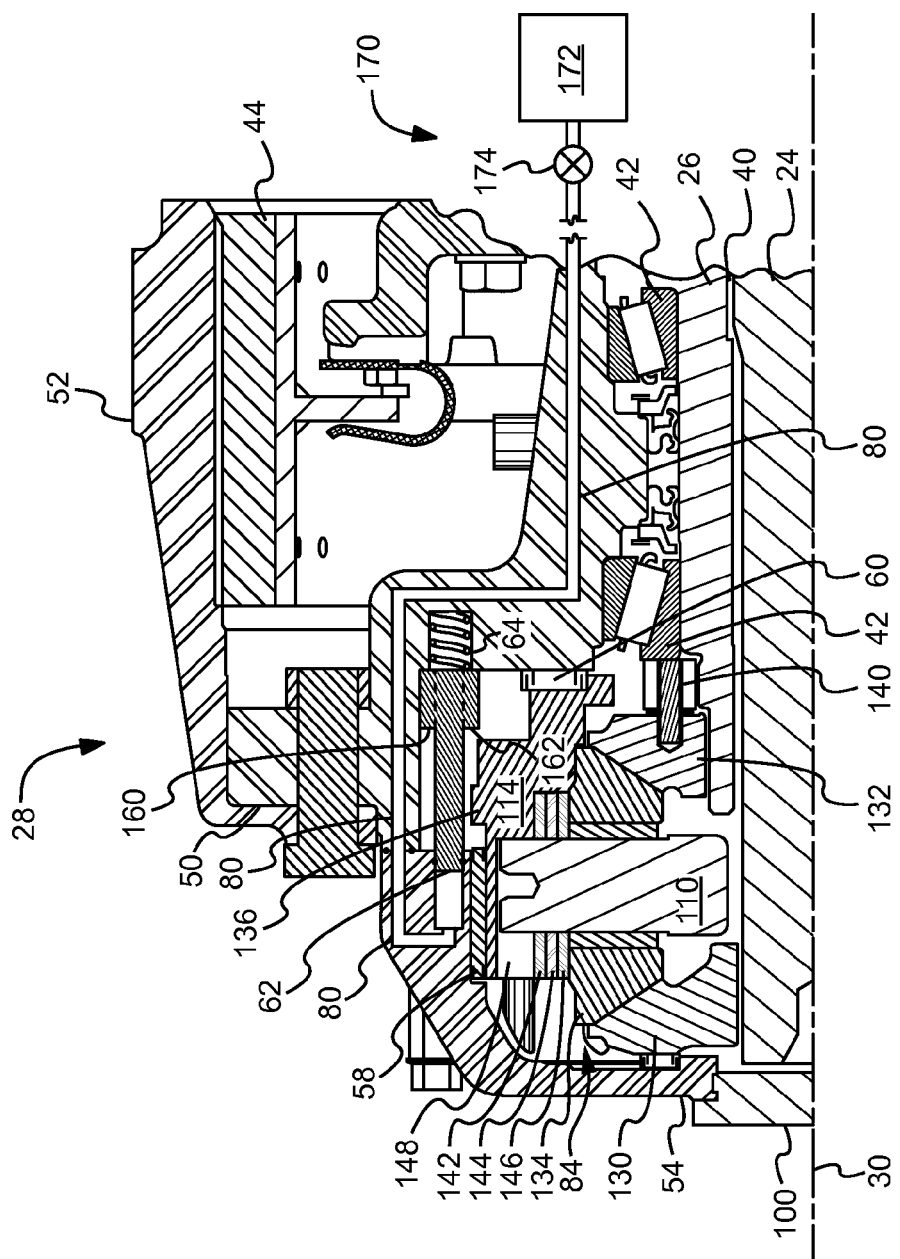

Actuation of the clutch collar 62 is best understood with reference to FIGS. 3 and 4. Although FIGS. 3 and 4 illustrate an embodiment that does not have a face gear interface between the clutch collar 62 and spider housing 114, the operational principles are similar when such a face gear configuration is employed. Actuation of the clutch collar 62 may be accomplished using a manual input or automatically using control logic that may be based on vehicle operating parameters.

In FIG. 3, the clutch collar 62 is shown in a first position. In the first position, the clutch collar 62 couples the spider housing 114 to the hub 50. More specifically, the clutch collar 62 is biased to the left from the perspective shown such that the second spline 162 mates with the spider housing spline 136 on the spider housing 114. Moreover, the first spline 160 of the clutch collar 62 mates with the hub spline 78. As such, the clutch collar 62 couples the spider housing 114 to the hub 50 such that the spider housing 114 and hub 50 may rotate together about the axis 30. Moreover, torque that is provided to the axle assembly 10 may be transmitted from the axle shaft 24 to the hub 50 via the spider assembly 56 and clutch collar 62.

In FIG. 4, the clutch collar 62 is shown in a second position. In the second position, the clutch collar 62 decouples the spider housing 114 from the hub 50. More specifically, the clutch collar 62 is moved to the right from the position shown in FIG. 3 such that the spider housing spline 136 does not mate with the second spline 162. The clutch collar 62 may move to the second position when the biasing force exerted by the actuator 170 overcomes the biasing force exerted by the biasing members 64. More specifically, the control valve 174 may be actuated to permit pressurized fluid to flow through the passage 80 to the clutch collar cavity 96. As such, the clutch collar 62 may move such that the second spline 162 disengages the spider housing spline 136. The first spline 160 may remain in engagement with the hub spline 78 as the clutch collar 62 moves from the first position to the second position.

In the second position, the hub 50 may rotate independently of the axle shaft 24 and spider assembly 56. As such, the hub 50 and its associated wheel assembly may rotate independently of the axle shaft 24 or "free wheel" such that rotation of the hub 50 does not transmit torque to the axle shaft 24 or spider assembly 56. In the second position, the transfer case clutch 18 may be positioned such that torque is not transmitted from the transfer case 12 to the input 14 of the axle assembly 10. This disengagement of the transfer case clutch 18 combined with movement of the clutch collar 62 to the second position helps isolate components of the axle assembly 10, such as the ring gear and pinion of the differential 22, axle shafts 24, and gears of the spider assembly 56, so that these components may remain stationary and not rotate. As a result, the noise produced by the axle assembly 10 may be reduced as these components are not being rotated or back driven by the rotation of the wheel assembly and hub 50. Such a configuration may be employed to reduce noise levels when a vehicle is operating in a two wheel drive mode in which torque is not provided to the axle assembly 10 and may improve fuel economy. Moreover, decoupling could be located at the axle carrier end of the axle shaft, at the input to the axle assembly, or in a transfer case.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a spindle;
   an axle shaft that extends through the spindle and is configured to rotate about an axis;
   a hub that is rotatably disposed on the spindle;
   a spider assembly that is configured to be rotated by the axle shaft, wherein the spider assembly has a set of hub reduction gears that are operatively connected to a spider housing;
   a thrust bearing disposed between the hub and the spider housing that inhibits axial movement of the spider housing with respect to the hub; and
   a clutch collar disposed between the hub and the spider housing;
   wherein the clutch collar is moveable along the axis between a first position in which the clutch collar couples the spider housing to the hub such that the spider housing rotates with the hub and a second position in which the clutch collar decouples the spider housing from the hub such that the hub rotates independently of the spider housing.

2. The axle assembly of claim 1 further comprising a cover that is fixedly disposed with respect to the hub and a bearing disposed between the spider housing and the cover that facilitates rotation of the spider housing with respect to the cover.

3. The axle assembly of claim 1 further comprising a biasing member that biases the clutch collar toward the first position.

4. The axle assembly of claim 3 wherein the biasing member is received in a pocket in the hub and engages the clutch collar.

5. The axle assembly of claim 1 further comprising an actuator that actuates the clutch collar from the first position to the second position.

6. The axle assembly of claim 5 wherein the actuator includes a pressurized fluid source that provides a pressurized fluid to actuate the clutch collar.

7. The axle assembly of claim 6 wherein the pressurized fluid is provided to the clutch collar via a passage that extends through the hub.

8. The axle assembly of claim 7 further comprising a cover that is fixedly disposed on the hub, wherein the passage extends through the cover to a clutch collar cavity that receives the clutch collar.

9. An axle assembly comprising:
   an axle shaft that is configured to rotate about an axis;
   a spindle that receives the axle shaft;
   a hub that is rotatably disposed on the spindle;
   a spider assembly rotatably coupled to the axle shaft, the spider assembly having a spider housing that is spaced apart from the hub;
   a cover that is fixedly disposed with respect to the hub and has a clutch collar cavity, wherein the cover and hub cooperate to define a cavity that receives the spider assembly;
   a bearing disposed in the cavity between the spider housing and the cover that facilitates rotation of the spider housing with respect to the cover; and
   a clutch collar that is disposed in the clutch collar cavity and configured to move between a first position in which the clutch collar couples the spider housing to the hub such that the spider housing rotates with the hub and a second position in which the clutch collar decouples the spider housing from the hub such that the hub rotates independently of the spider housing.

10. The axle assembly of claim 9 further comprising a thrust bearing disposed between the hub and the spider housing that inhibits axial movement of the spider housing with respect to the hub.

11. The axle assembly of claim 9 wherein the axle assembly further comprises an input for receiving torque and the spider assembly further comprises a set of hub reduction gears that provide gear reduction from the axle shaft to the hub, wherein the axle shaft and set of hub reduction gears do not rotate when the clutch collar is in the second position and torque is not provided to the input.

12. The axle assembly of claim 9 wherein the clutch collar includes a first spline and the hub includes a hub spline, wherein the first spline mates with the hub spline to inhibit rotation of the clutch collar with respect to the hub.

13. The axle assembly of claim 12 wherein the first spline mates with the hub spline when the clutch collar is in the first position and the second position.

14. The axle assembly of claim 12 wherein the clutch collar includes a second spline and the spider housing includes a spider housing spline, wherein the second spline engages the spider housing spline when the clutch collar is in the first position and wherein the second spline disengages the spider housing spline when the clutch collar is in the second position.

15. An axle assembly comprising:
  an axle housing having an input for receiving torque;
  an axle shaft that is at least partially disposed in the axle housing and that is coupled to the input;
  a spindle that is connected to the axle housing, wherein the axle shaft extends through the spindle;
  a hub that is rotatably disposed on the spindle;
  a spider assembly that is configured to be rotated by the axle shaft, the spider assembly having a spider housing and a set of hub reduction gears that provide gear reduction from the axle shaft to the hub; and
  a clutch collar disposed between the hub and the spider housing;
  wherein the clutch collar is moveable between a first position in which the clutch collar couples the spider housing to the hub such that the spider housing rotates with the hub and a second position in which the clutch collar decouples the spider housing from the hub such that the hub rotates independently of the spider housing and axle shaft; and
  wherein the axle shaft and set of hub reduction gears do not rotate when the clutch collar is in the second position and torque is not provided to the input.

16. The axle assembly of claim 15 further comprising a biasing member that extends from the hub to the clutch collar and that biases the clutch collar toward the first position.

17. The axle assembly of claim 15 further comprising an actuator that moves the clutch collar from the first position to the second position.

18. The axle assembly of claim 15 wherein the input is decoupled from a transfer case when the clutch collar is in the second position.

19. The axle assembly of claim 15 further comprising a thrust bearing disposed between the hub and the spider housing that inhibits axial movement of the spider housing with respect to the hub.

20. The axle assembly of claim 19 further comprising a cover that is fixedly disposed with respect to the hub and a bearing disposed between the spider housing and the cover that facilitates rotation of the spider housing with respect to the cover.

* * * * *